(12) United States Patent
Mohammad et al.

(10) Patent No.: US 12,548,710 B2
(45) Date of Patent: Feb. 10, 2026

(54) THERMAL DESIGN OF HIGH-POWER WIRELESS CHARGING SYSTEM

(71) Applicant: UT-Battelle, LLC, Oak Ridge, TN (US)

(72) Inventors: Mostak Mohammad, Knoxville, TN (US); Omer C. Onar, Knoxville, TN (US); Jonathan P. Wilkins, Knoxville, TN (US); Veda Prakash Galigekere Nagabhushana, Knoxville, TN (US); Gui-Jia Su, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/440,074

(22) Filed: Feb. 13, 2024

(65) Prior Publication Data
US 2024/0274352 A1 Aug. 15, 2024

Related U.S. Application Data

(60) Provisional application No. 63/445,341, filed on Feb. 14, 2023.

(51) Int. Cl.
*H01F 38/14* (2006.01)
*B60L 53/122* (2019.01)
(Continued)

(52) U.S. Cl.
CPC ............ *H01F 38/14* (2013.01); *B60L 53/122* (2019.02); *B60L 53/302* (2019.02); *H01F 27/10* (2013.01); *H01F 27/24* (2013.01); *H02J 50/12* (2016.02)

(58) Field of Classification Search
CPC ....................................................... H01F 38/14
(Continued)

(56) References Cited

U.S. PATENT DOCUMENTS 9,451,723 B2 9/2016 Lofy et al.
2016/0261233 A1* 9/2016 Pohl ....................... H04B 5/263
(Continued)

FOREIGN PATENT DOCUMENTS

WO 2020/142621 A2 7/2020

OTHER PUBLICATIONS

Kindl, V. et al., "Inductive coupling system for electric scooter wireless charging: electromagnetic design and thermal analysis", Electrical Engineering, vol. 102, No. 1, 2020, pp. 3-12.
(Continued)

*Primary Examiner* — Joseph Chang
(74) *Attorney, Agent, or Firm* — Warner Norcross + Judd LLP

(57) ABSTRACT

A receiver construction and/or a transmitter assembly is provided for transfer of wireless power. The receiver and/or transmitter assemblies may include a respective receiver or transmitter coil assembly, a backing, and a core provided between the backing and the respective receiver or transmitter coil assembly. The receiver coil assembly and/or the transmitter coil assembly may include one or more coils provided in an epoxy operable to facilitate thermal transfer from the one or more coils to at least one of the core and the backing. A thermally conductive element may be provided between the backing and the core.

20 Claims, 7 Drawing Sheets

(51) Int. Cl.
*B60L 53/302* (2019.01)
*H01F 27/10* (2006.01)
*H01F 27/24* (2006.01)
*H02J 50/12* (2016.01)

(58) Field of Classification Search
USPC .......................................................... 307/9.1
See application file for complete search history.

(56) References Cited

U.S. PATENT DOCUMENTS

| 2022/0085652 | A1* | 3/2022 | Pries | .................... H01F 38/14 |
| 2022/0115939 | A1* | 4/2022 | Neff | ...................... H02P 6/006 |
| 2022/0247233 | A1* | 8/2022 | Mohammad | .......... H01F 27/366 |

OTHER PUBLICATIONS

Rasekh, N. et al., "Thermal analysis and electromagnetic characteristics of three single-sided flux pads for wireless power transfer", Journal of Cleaner Production, vol. 243, 2020, pp. 1-12.

Tiemann, M. et al., "Magnetic and Thermal Coupled Field Analysis of Wireless Charging Systems for Electric Vehicles," IEEE Transactions on Magnetics, vol. 55, No. 6, Jun. 2019, pp. 1-4.

Liang, C. et al., "Modeling and Analysis of Thermal Characteristics of Magnetic Coupler for Wireless Electric Vehicle Charging System", IEEE Access, vol. 8, Sep. 21, 2020, pp. 173177-173185.

Niu, S. et al., "Power loss analysis and thermal assessment on wireless electric vehicle charging technology: The over-temperature risk of ground assembly needs attention", Applied Energy, vol. 275, No. 115344, 2020, pp. 1-14.

Kim, S. et al., "Thermal Characterisation of a Double-D Pad", IEEE PELS Workshop on Emerging Technologies: Wireless Power Transfer, 2019, pp. 1-5.

Hwang, K. et al., "Thermal Analysis for Temperature Robust Wireless Power Transfer Systems", IEEE Wireless Power Transfer, 2013, pp. 52-55.

Zhang, B. et al., "Thermal Analysis and Design of a 30KW EV Wireless Charger with Liquid-Cooled Shell for Magnetic Coupler and Integrated Power Converter", 2021 IEEE Applied Power Electronics Conference and Exposition, 2021, pp. 426-431.

Mohammad, M. et al., "Optimization of Ferrite Core to Reduce the Core Loss in Double-D Pad of Wireless Charging System for Electric Vehicles", 2018, pp. 1350-1356.

Wrobel, R. et al., "Analytical Methods for Estimating Equivalent Thermal Conductivity in Impregnated Electrical Windings Formed Using Litz Wire", IEEE International Electric Machines and Drives Conference, 2017, pp. 1-8.

\* cited by examiner

PHASE A  PHASE B  PHASE C

THERMAL DESIGN OF HIGH-POWER WIRELESS CHARGING SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of transferring power wirelessly, and more particularly to receiver and transmitter assemblies for wireless power transfer.

BACKGROUND

Wireless charging systems (WCSs) are one of the most promising technologies being investigated to enhance the convenience of charging mobile objects, such as electric vehicles (EVs). Improvement in the efficiency and power density of WCSs along with the rapid growth of the EV market-which benefits from fast and convenient charging— have resulted in significant academic and industrial research attention on developing WCSs for high-power EV charging. However, for high-power applications, such as EV charging, the WCSs are highly prone to produce a significant level of electromagnetic field (EMF) emissions.

For instance, in EV applications, demand for fast charging utilizes extremely high-power charging technology. While commercial plug-in charging for light-duty vehicles ranges up to 350 kW power, the WCS technology is at its early stage considering commercial application. The Society of Automotive Engineers (SAE) has published the standard J2954 in 2020 for up to 11 kW power for light-duty vehicles, which is a milestone for the WCS in EV applications. In parallel to low-power WCS, industries and academia are actively investigating high-power WCSs to meet the demand of fast charging systems. As the power levels are increasing, thermal effects are often a limiting factor in providing a compact WCS to meet the strict size constraints of EV applications.

SUMMARY

In general, one innovative aspect of the subject matter described herein can be embodied in a three-phase wireless power transfer (3φ-WPT) system for wirelessly providing high-frequency AC power to an electric vehicle or a plug-in electric vehicle. The system may include an off-board transmitter with a transmitter pad configured to wirelessly transmit the high-frequency AC power. The system may include an on-board receiver with a receiver pad configured to receive the high-frequency AC power when the transmitter pad and the receiver pad are disposed adjacent to each other and spaced apart through a gap. The transmitter pad and the receiver pad may each include three bipolar coils, an Al backplate, a ferrite core sandwiched between the three bipolar coils and the Al backplate, and a thermally conducting film arranged and configured to thermally couple the ferrite core and the Al backplate. The transmitter pad and the receiver pad may be arranged to face each other's three bipolar coils across the gap.

The foregoing and other embodiments can each optionally include one or more of the following features, alone or in combination. In particular, one embodiment includes all the following features in combination.

In some embodiments, the thermally conducting film of each of the transmitter pad and the receiver pad may include epoxy.

In some embodiment, the thermally conducting film of the transmitter pad may include thermal paste, and the thermally conducting film of the receiver pad may include epoxy.

In some embodiments, either the transmitter pad or the receiver pad or both may include a thermally conducting and electrically insulating plastic support having channels, where the corresponding three phase coils may be disposed inside the support's channels.

In some embodiments, the transmitter pad and the receiver pad each may include an electrically insulating plastic support having channels. The transmitter pad's three bipolar coils and the receiver pad's three bipolar coils may be disposed inside the corresponding support's channels, and either the transmitter pad or the receiver pad or both may include thermally conducting and electrically insulating epoxy filling the corresponding support's channels such that the three bipolar coils disposed therein are immersed in the epoxy. The plastic support may be fully or partially removed after filling the transmitter and receiver pad with epoxy.

In some embodiments, either the transmitter pad or the receiver pad or both may include thermally conducting and electrically insulating epoxy encapsulating the corresponding three bipolar coils.

In some embodiments, the Al backplate of either the transmitter pad or the receiver pad or both may be configured for liquid cooling.

In some embodiments, the high-frequency AC power may be in a range of 50-250 kW or even higher.

In some embodiments, the high-frequency AC power may be about 150 kW.

In some embodiments, a fundamental frequency of the high-frequency AC power may be in a range of 10-100 kHz.

In some embodiments, the fundamental frequency may be about 85 kHz.

In general, one innovative aspect of the subject matter described herein can be embodied in a wireless power transmitter including a transmitter configured to wirelessly transmit power. The transmitter may include three bipolar coils operable to transmit power wirelessly to a wireless receiver separate from the wireless power transmitter. The wireless power transmitter may include an aluminum backplate, and a ferrite core disposed between the three bipolar coils and the aluminum backplate. The wireless power transmitter may include a thermally conducting film arranged to thermally couple the ferrite core to the aluminum backplate. This thermally conducting film can be either electrically conductive or insulative.

The foregoing and other embodiments can each optionally include one or more of the following features, alone or in combination. In particular, one embodiment includes all the following features in combination.

In some embodiments, the transmitter may be configured to transmit three-phase power.

In some embodiments, the thermally conducting film may include epoxy.

In some embodiments, the thermally conducting film may include thermal paste.

In some embodiments, the wireless power transmitter may include a thermally conducting and electrically insulating plastic support that includes channels, where the three bipolar coils are disposed respectively within the channels of the thermally conducting and electrically insulating plastic support.

In general, one innovative aspect of the subject matter described herein can be embodied in a wireless power receiver comprising a receiver configured to wirelessly receive power. The receiver may include three bipolar coils operable to receive power wirelessly from a wireless transmitter separate from the wireless power receiver. The wireless power receiver may include an aluminum backplate and a ferrite core disposed between the three bipolar coils and the aluminum backplate. The wireless power receiver may include a thermally conducting film arranged to thermally couple the ferrite core to the aluminum backplate.

The foregoing and other embodiments can each optionally include one or more of the following features, alone or in combination. In particular, one embodiment includes all the following features in combination.

In some embodiments, the receiver may be configured to receive three-phase power.

In some embodiments, the thermally conducting film may include epoxy.

In some embodiments, the wireless power receiver may include thermally conducting and electrically insulating epoxy that encapsulates the three bipolar coils.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION

Figure 1:
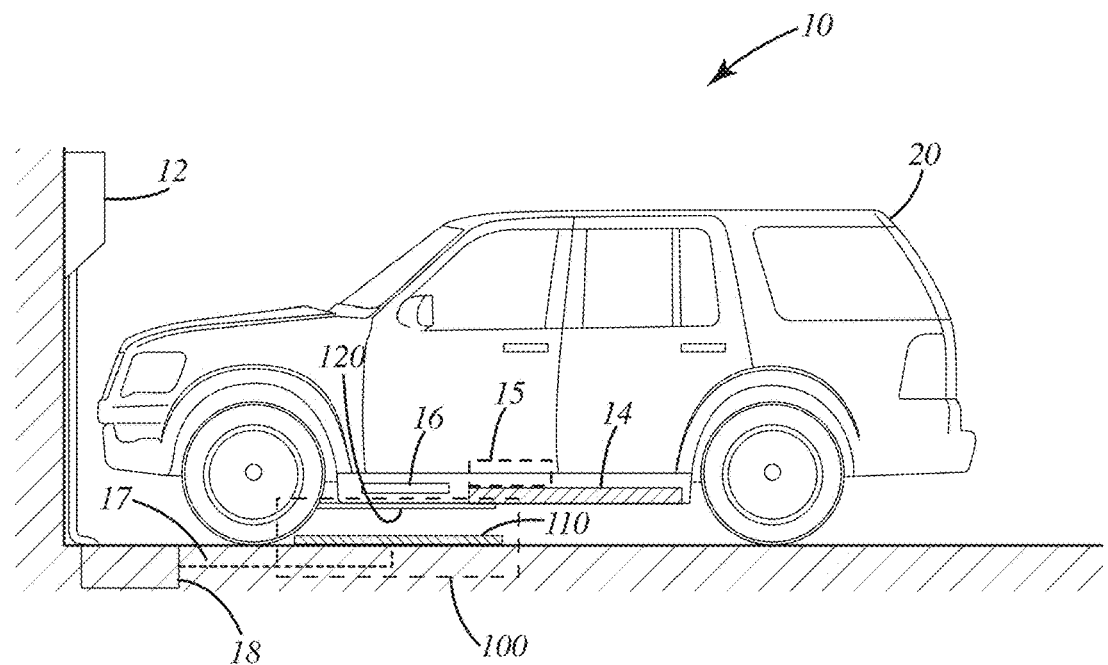
FIG. 1 shows a wireless power system in accordance with one embodiment.

The present disclosure is directed to a receiver construction and/or a transmitter assembly for transfer of wireless power. The receiver and/or transmitter assemblies may include a respective receiver or transmitter coil assembly, a backing (e.g., an aluminum backing), and a core (e.g., a ferrite core) provided between the backing and the respective receiver or transmitter coil assembly. The receiver coil assembly and/or the transmitter coil assembly may include one or more coils (e.g., three bipolar coils) provided in an epoxy operable to facilitate thermal transfer from the one or more coils to at least one of the core and the backing. In one embodiment, a thermally conductive element may be provided between the backing and the core.

In a wireless power system such as a high-power electric vehicle (EV) wireless charging system (WCS), the thermal constraints and thermal management of wireless power transmitter (e.g., a transmitter pad) can be much different than that of a wireless power receiver (e.g., a receiver pad). The wireless power transmitter can be either placed, or flush mounted, on the ground or buried a few inches below the pavement, such as concrete or asphalt. Depending on the power level and the availability of the space, compensation components and power-electronics components can be integrated at the back of the wireless power transmitter or placed separately in a power-electronics housing. The compensation circuitry (including resonant capacitors) may have much lower thermal limits than the rest of the components, e.g., a coil, core, etc., of the system. Therefore, the capacitors of the compensation circuitry may be configured for greater thermal conditions in cases where they are integrated at the back of a wireless power transmitter or wireless power receiver. For a high-power system, e.g., >100 kW, inverters and compensation networks may be placed separately with the power electronics with a cooling system. Due to its planer geometry and large surface area, a wireless power transmitter (e.g., a wireless charging pad) may be configured for operation without any liquid cooling for up to several hundred kilowatts. However, forced cooling (e.g., air and/or liquid) may be utilized. For instance, forced cooling may be provided if a strict volume restriction is given, or if the power electronics and the compensation components are integrated proximal to or with the wireless power transmitter or wireless power receiver.

For a wireless power receiver (e.g., a receiver pad), a compact design is often utilized because the wireless power receiver is provided in a mobile object, such as being mounted underneath a vehicle 20. Furthermore, optionally, a liquid cooling system 15 may be available from the object (e.g., the vehicle 20) to facilitate cooling the wireless power receiver. (A liquid cooling system, similar to the liquid cooling system 15, is optionally provided on the transmitter-side to facilitate cooling the wireless power transmitter.) There are two potential configurations based on the availability of a cooling system: first, the compensation-components and rectifier may be placed separately in the vehicle power-electronics housing; second, the compensation network and the rectifier may be mounted on the back of the wireless power receiver (e.g., the charging pad). In the first option, the wireless power receiver can be configured for up to several hundred kilowatts without a cooling channel going through the wireless power receiver. However, for the second option, a cooling channel may be utilized to keep the temperature below a certain threshold. Both options may involve thermal considerations for losses, packaging, and the available cooling system.

In one embodiment according to the present disclosure, thermal-design enhancement or optimization may be provided by assuming the wireless power transmitter and the wireless power receiver (e.g., the charging pads) are placed separately from a compensation circuitry (e.g., compensation network), inverter circuitry, and rectifier circuitry, and that the wireless power transmitter and the wireless power receiver are naturally cooled. The goal of the thermal design optimization is to keep the surface temperature of the wireless power transmitter and the wireless power receiver below a threshold limit, such as below 80° C., and the internal component temperature below a maximum limit. As described herein, aspects of the thermal design include one or more of the following:

- identification of the loss-density area and thermal conduction path;
- filling a coil assembly of the wireless power transmitter and/or the wireless power receiver with a thermal epoxy to reduce or minimize the loss-density in the thermally sensitive material; and
- providing a backplate (e.g., an aluminum back plate) that is utilized to enhance or maximize thermal balance and heat dissipation.

A WPS 10, such as a 50 kW polyphase WPS (potentially a 50 kW to 250 KW or greater (e.g., 750 kW or greater), or 150 KW system), may be configured for thermal mitigation or optimization of a conduction cooled charging transmitter and/or receiver. The core and Litz wire-based coils are the two main sources of heat in a wireless power transmitter and/or receiver, which may provide significant heat inside the transmitter and/or receiver. Herein, a thermal mitigation element, such as a thermally conductive and electrically insulative epoxy, may be utilized to fill the transmitter and/or receiver to increase the heat transfer from the coil and core. The thermal mitigation element, such as the epoxy-filling, may balance heat transfer relative to a conventional unfilled configuration.

The core in some circumstances may be subject to one or more significant thermal hotspots, for which a backplate (e.g., an aluminum backplate) can be configured to mitigate. A thermally conducting layer (e.g., a thin layer of thermally conductive epoxy and paste) may be provided between the core (e.g., a ferrite core) and a backplate (e.g., an aluminum backplate) to improve thermal characteristics of a conduction cooled WPS. This configuration may yield significant mitigation of hotspots at the center of a bipolar polyphase transmitter and/or receiver.

I. Overview

A wireless power system (WPS) 10 (e.g., a wireless charging system) in accordance with one embodiment is depicted in FIG. 1. The WPS 10 may include a wireless power transmitter 110, which may be incorporated into a surface over which a mobile object, such as a vehicle 20, can be positioned. The mobile object may include a wireless power receiver 120 operable to receive power from the wireless power transmitter 110. For instance, in the illustrated embodiment, the vehicle 20 may be driven into position over the wireless power transmitter 110 to receive power wirelessly via the wireless power receiver 120. Although the mobile object of the WPS 10 is described herein as a vehicle 20, it should be understood that the present disclosure is not so limited and that the mobile object may be any type of device or object that incorporates a wireless power receiver 120.

The WPS 10 in the illustrated embodiment includes a power interface 12 operable to receive power from a power source, such as utility power. The power interface 12 may be coupled to switching circuitry 18 operable to supply power to the wireless power transmitter 110 in order to transfer power wirelessly to the wireless power receiver 120. The switching circuitry 18 may be coupled to the wireless power transmitter 110 via a high-frequency conductive link 17.

The wireless power receiver 120, as described herein, may receive power wirelessly from the wireless power transmitter 110. The wireless power receiver 120 may be coupled electrically to a vehicle controller 16, which may be operable to direct power received from the wireless power receiver 120 toward a battery 14. As described herein, the wireless power system 10 is not limited to a particular type of mobile object—for instance, a battery 14 may be absent from the mobile object in one embodiment. Likewise, a vehicle controller 16 may be replaced with a mobile object controller operable to direct power received from the wireless power receiver 120 toward one or more components of the mobile object controller.

As discussed herein, the WPS 10 may be configured differently than the configuration depicted in the illustrated embodiment. For instance, the WPS 10 in the illustrated embodiment incorporates a bipolar coil assembly in both the wireless power receiver 120 and the wireless power transmitter 110; however, the WPS 10 may be configured differently. For instance, one or more aspects of the wireless power transmitter 110 or wireless power receiver 120 described herein may be incorporated into a three-phase unipolar coil configuration or a single phase coil configuration. It is further noted that a variety of shielding configurations are described herein with respect to single phase or multiphase configurations. It is noted that any aspect of embodiments described in conjunction with a single-phase configuration may be incorporated into a multiphase configuration, and likewise any aspect of embodiments described in conjunction with multiphase configurations may be incorporated into a single-phase configuration. Additional example shielding constructions are described in U.S. patent application Ser. No. 17/587,261, filed Jan. 28, 2022, entitled "Shielding System for Wireless Power Transfer" and U.S. patent application Ser. No. 17/587,265, filed Jan. 28, 2022, entitled "Shielding System for Wireless Power Transfer"—the disclosures of which are incorporated by reference herein in their entireties.

The input voltage of the WPS 10 may be provided via the power interface 12 in the form of AC power (e.g., grid power that is single phase or multi-phase), which may be supplied to the switching circuitry 18. The switching circuitry 18, in the illustrated embodiments of FIGS. 3 and 4, may convert the power received from the power interface 12 into DC power in the form of a DC source 50, the power output of which can be inverted by inverter circuitry 52 in accordance with a switching frequency to yield a high-frequency signal. This high-frequency signal may be supplied to the wireless power transmitter 110 in order to transfer wireless power to the wireless power receiver 120. Compensation circuitry 54 may be provided between the DC source 50 and the wireless power transmitter 110. As described herein, the wireless power transmitter 110 and the wireless power receiver 120 may form a wireless power coupler 100.

Figure 3:
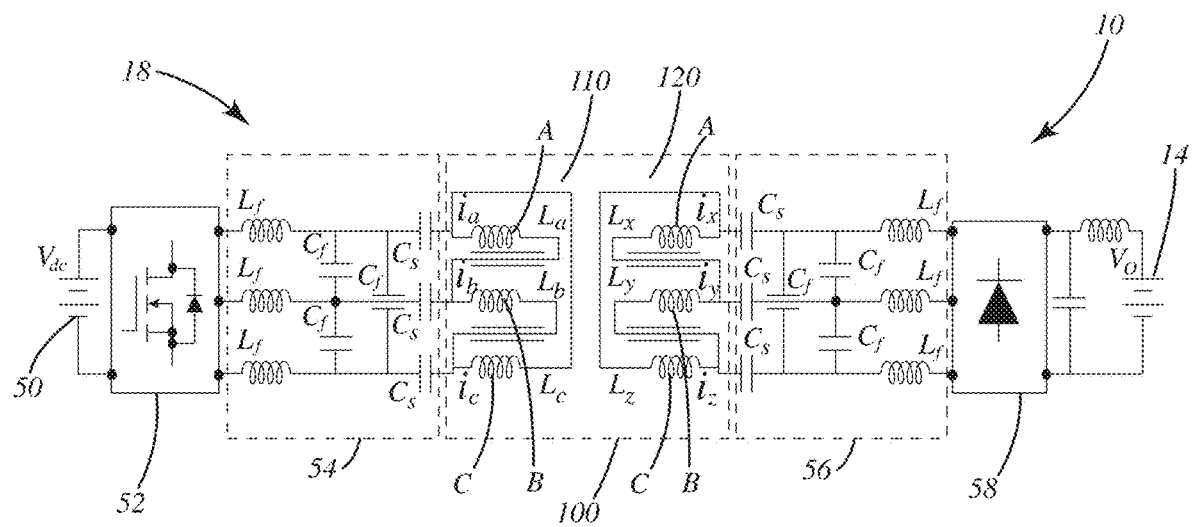
FIG. 3 shows a representative circuit of a wireless power system in accordance with one embodiment.
Figure 4:
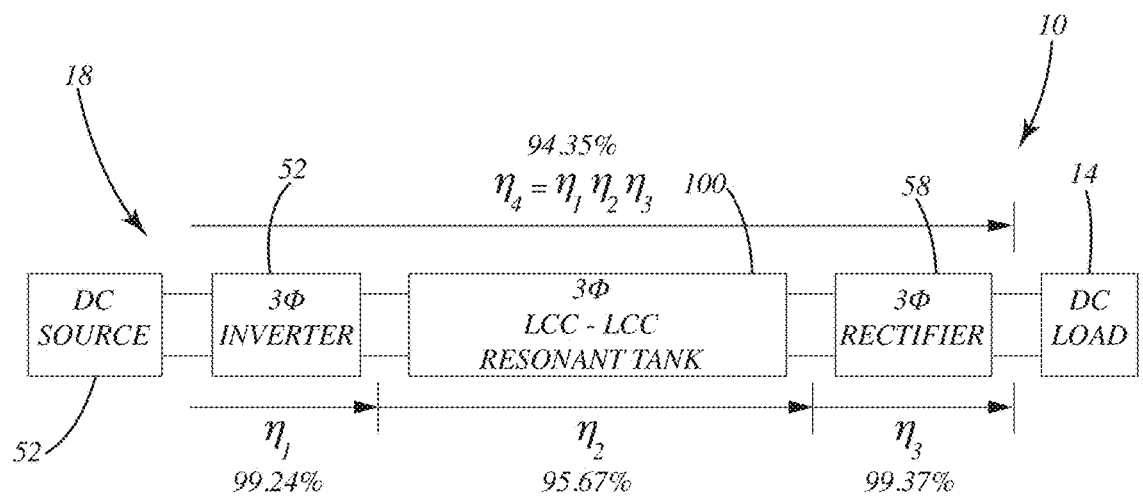
FIG. 4 shows a representative circuit of a wireless power system in accordance with one embodiment.
Figure 5:
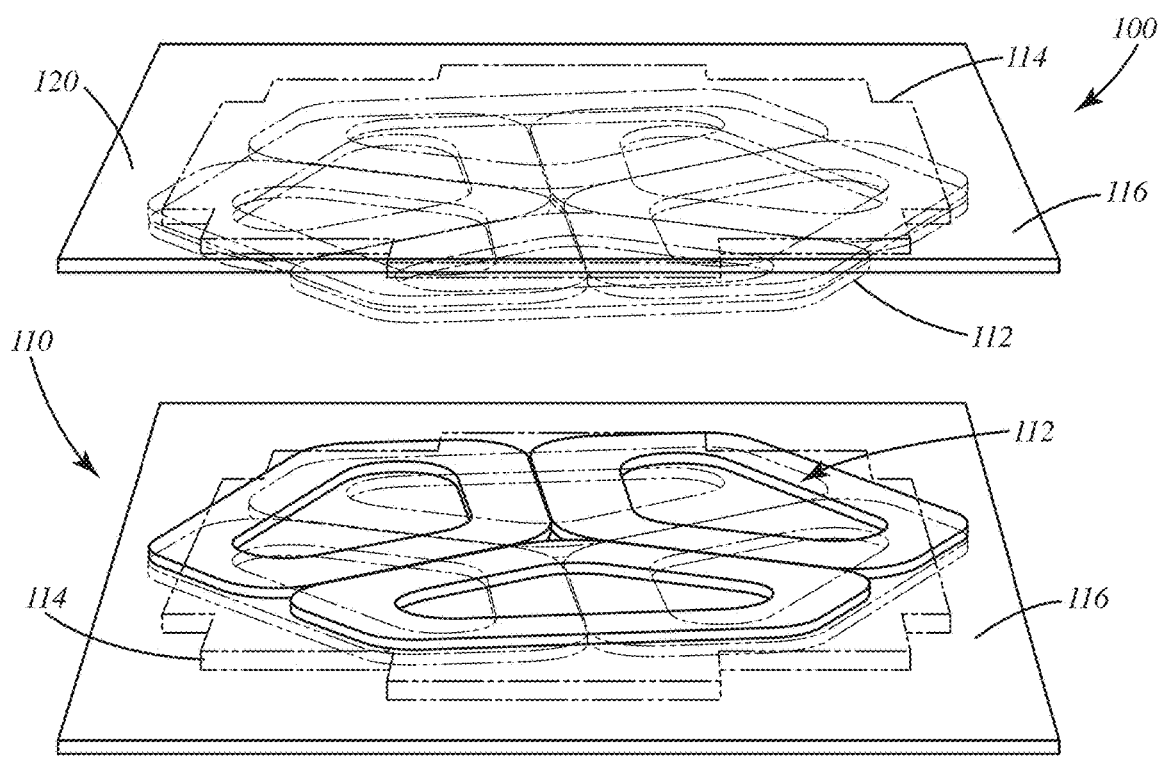
FIG. 5 shows a wireless power coupler in accordance with one embodiment.

In the illustrated embodiments of FIGS. 3 and 4, the switching circuitry 18 may include rectification circuitry (passive or active) operable to convert AC power received from the power interface 12 into the DC power, thereby operating as a type of DC source 50. It is noted that the switching circuitry 18, including the inverter circuitry 52 and the compensation circuitry 54, in the illustrated embodiments of FIGS. 4 and 5 is configured for multi-phase (e.g., three phase) operation with multiple coils of the wireless power coupler 100. The switching circuitry 18 may be configured in one embodiment to vary power, or a characteristic thereof, that is supplied to the wireless power transmitter 110.

The WPS 10 in the illustrated embodiment of FIG. 1 includes a mobile object in the form of a vehicle 20. However, the mobile object may be any type of apparatus or device, including, for instance, a mobile phone, a drone, a robotic-device, or tabletop appliance. Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The vehicle 20 in the illustrated embodiment includes a wireless power receiver 120 (e.g., a receiver) separable from and capable of coupling with a wireless power transmitter 110. Together, as described herein, the wireless power receiver 120 and the wireless power transmitter 110 may form a wireless power coupler 100.

In the illustrated embodiment, the wireless power transmitter 110 may be considered an off-board module, and one or more aspects of the vehicle 20, as described herein, may be considered an on-board module. For instance, the vehicle controller 16 may include rectification circuitry that forms at least part of an on-board module of a vehicle. The on-board module may form part of an energy storage charging system of the vehicle 20, where a load is a battery 14 of the vehicle 20.

The switching circuitry 18 in the illustrated embodiment may include inverter circuitry 52 in the form of an H-bridge inverter configuration (e.g., a full bridge) with first, second, third, and fourth switches S1, S2, S3, S4 capable of operating in conjunction with each other to provide input power to the wireless power transmitter 110. The switches S1, S2, S3, S4 may be MOSFETs or any other type of switch capable of selectively supplying power to the wireless power transmitter 110. The switches S1, S2, S3, S4 may be operably coupled respectively to diodes D1, D2, D3, D4, which may be integral body diodes of the switches S1, S2, S3, S4.

The switching circuitry 18 may include a controller operatively coupled to one or more components of the WPS 10 to direct operation of the inverter circuitry 52 to generate the high frequency signal supplied to the wireless power transmitter 110.

The switching circuitry 18 may include any and all electrical circuitry and components to carry out the functions and algorithms described herein. Generally speaking, the switching circuitry 18 may include one or more microcontrollers, microprocessors, and/or other programmable electronics that are programmed to carry out the functions described herein. The switching circuitry 18 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the WPS 10, or they may reside in a common location within the WPS 10. When physically distributed, the components may communicate using any suitable serial or parallel communication protocol, such as, but not limited to, CAN, LIN, FireWire, I2C, RS-232, RS-485, and Universal Serial Bus (USB).

The wireless power receiver 120 in the illustrated embodiment of FIGS. 3 and 4 is connected to a receiver-side compensation circuitry 56 and a receiver-side rectifier 58, which is configured to convert AC power received by the wireless power receiver 120 into DC power for consumption by a load, such as the battery 14.

Figure 2:
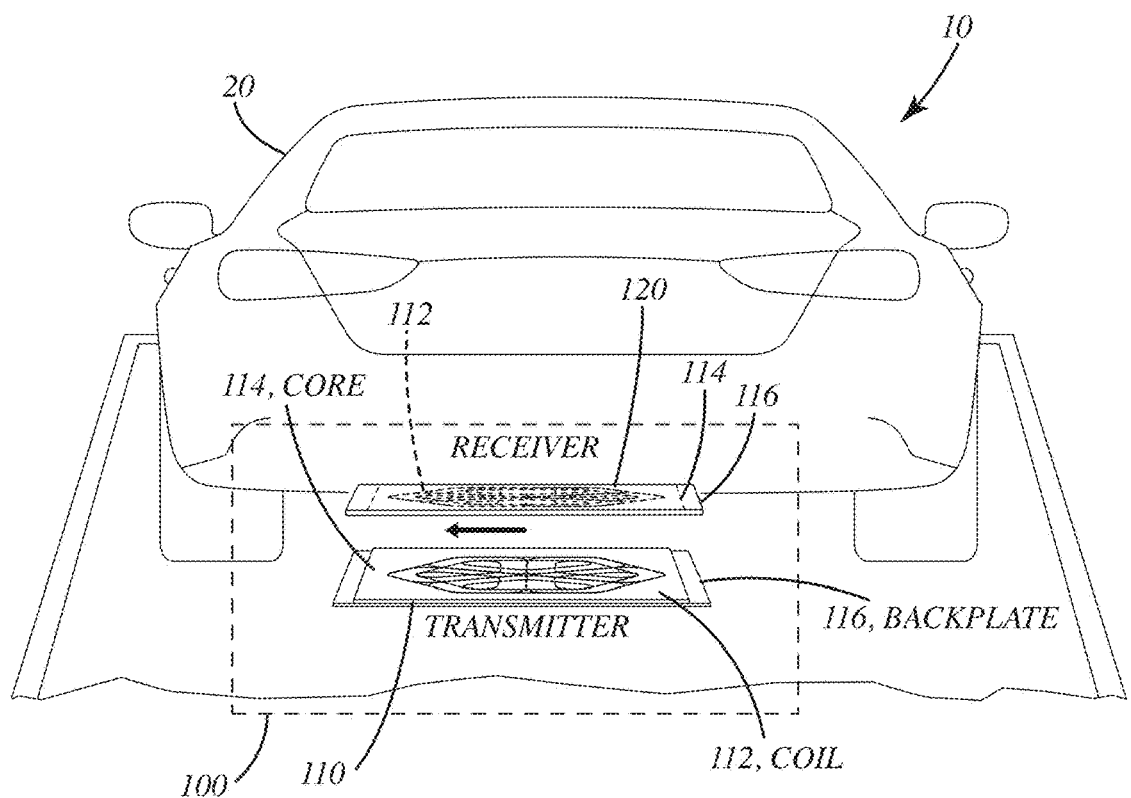
FIG. 2 shows a wireless power system in accordance with one embodiment.

A partial view of the WPS 10 in accordance with one embodiment is depicted in FIG. 2 with the wireless power coupler 100 including the wireless power transmitter 110 and the wireless power receiver 120 spaced apart from each other and separated by an airgap. The wireless power transmitter 110 in the illustrated embodiment includes a coil assembly 112, a core 114, and a backplate 116. The coil assembly 112 may correspond to a receiver or a transmitter respectively for a wireless power receiver 120 or a wireless power transmitter 110. The backplate 116 may be a shield for electromagnetic flux and/or radiation. The backplate 116 in the illustrated embodiment is an aluminum backplate that is 4 mm thick-however, the thickness and type of material may vary from application to application.

As described herein, the coil assembly 112 may be a bipolar coil configuration, and the core 114 may be a ferrite, nanocrystalline, amorphous, or similar high permeability core. The wireless power receiver 120 may be provided with a similar configuration, including a coil assembly 112, a core 114, and a backplate 116 (also described as a backing), with the wireless power receiver 120 spaced from the wireless power transmitter 110 by a distance.

The core 114, in one embodiment, may be formed of multiple separate elements, such as tiles, that can be arranged to form the core 114 and position the core 114 relative to the coil assembly 112. For instance, the core 114 may be formed by a plurality of ferrite tiles with various shapes, which may be arranged to provide a surface area greater in size than the area of the coil assembly 112.

The core 114, as described herein, may be formed of ferrite and can be configured for up to the saturation flux, which commonly ranges up to 550 mT peak flux (or greater).

In a WPS 10 configured for single-phase with a wireless power transmitter 110 including one transmitter coil A, B, C and a wireless power receiver 120 including one receiver coil A, B, C, the coil currents at resonance frequency are approximately 90-degree phase apart. A WPS 10 operable for polyphase or multiphase, on the other hand, may have two or more phases on each of the wireless power transmitter 110 and the wireless power receiver 120, and one or more coil-windings A, B, C for each phase. A wireless power coupler 100 operable for use with such a polyphase-configured WPS 10 is depicted in illustrated embodiment of FIGS. 3 and 4.

II. Coil Assembly

A WPS 10 in one embodiment may include a polyphase configuration, including the wireless power coupler 100 depicted in illustrated embodiments of FIGS. 1-4. The wireless power coupler 100, as described herein, may include a wireless power transmitter 110 and a wireless power receiver 120. The wireless power coupler 100 in illustrated embodiment of FIG. 5 is configured in this manner, where each of the wireless power transmitter 110 and the wireless power receiver 120 includes a coil assembly 112, a core 114, and a backplate 116.

The coil assembly 112 in the illustrated embodiment includes three bipolar coils A, B, C backed by a ferrite core 114. The three bipolar coils A, B, C in each of the wireless power transmitter 110 and the wireless power receiver 120 may be placed 120 degrees rotated from each other.

Figure 6:
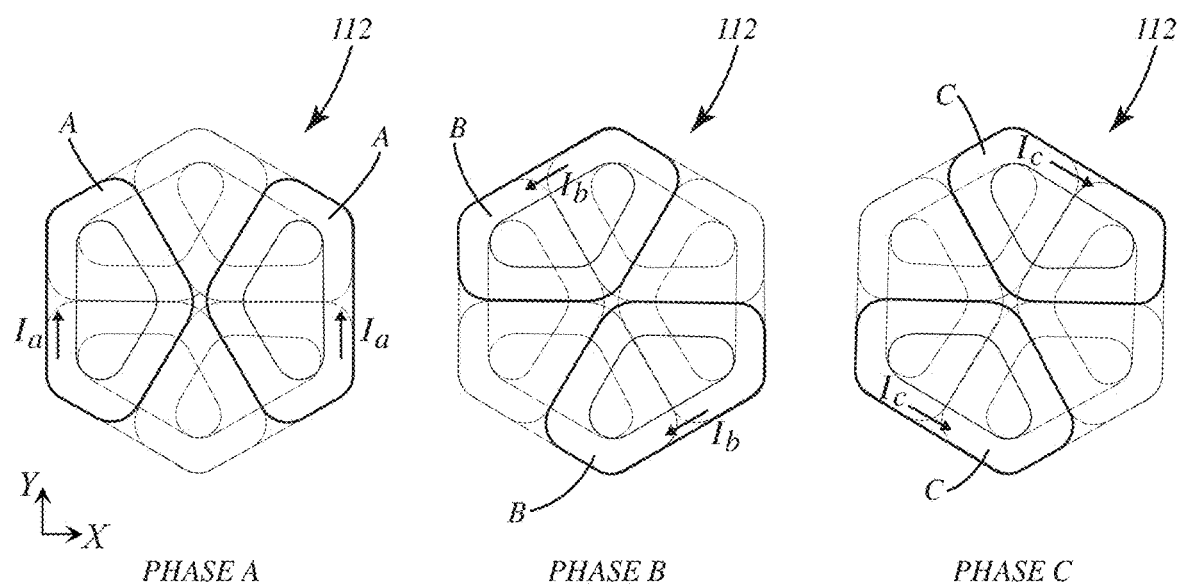
FIG. 6 shows phase currents of a wireless power transmitter in accordance with one embodiment.

The lumped coil geometry of Phases A, B, and C of the wireless power transmitter 110 are shown in FIG. 6. To balance the inductance, each phase-coil A, B, C of the coil assembly 112 has one winding on the top-layer and one winding on the bottom layer. The current direction in the phase-coils A, B, C of the coil assembly 112 are indicated in FIG. 6. The phase coils A, B, C of the coil assembly 112 may be Litz wire or another type of conductor operable to facilitate wireless power transfer. In the illustrated embodiment, each phase coil A, B, C of the coil assembly 112 includes five turns and is formed of AWG6 Litz wire (AWG38 strands)—however, it is to be understood that the number of turns and the type and configuration of the Litz wire may vary from application to application.

Figure 7:
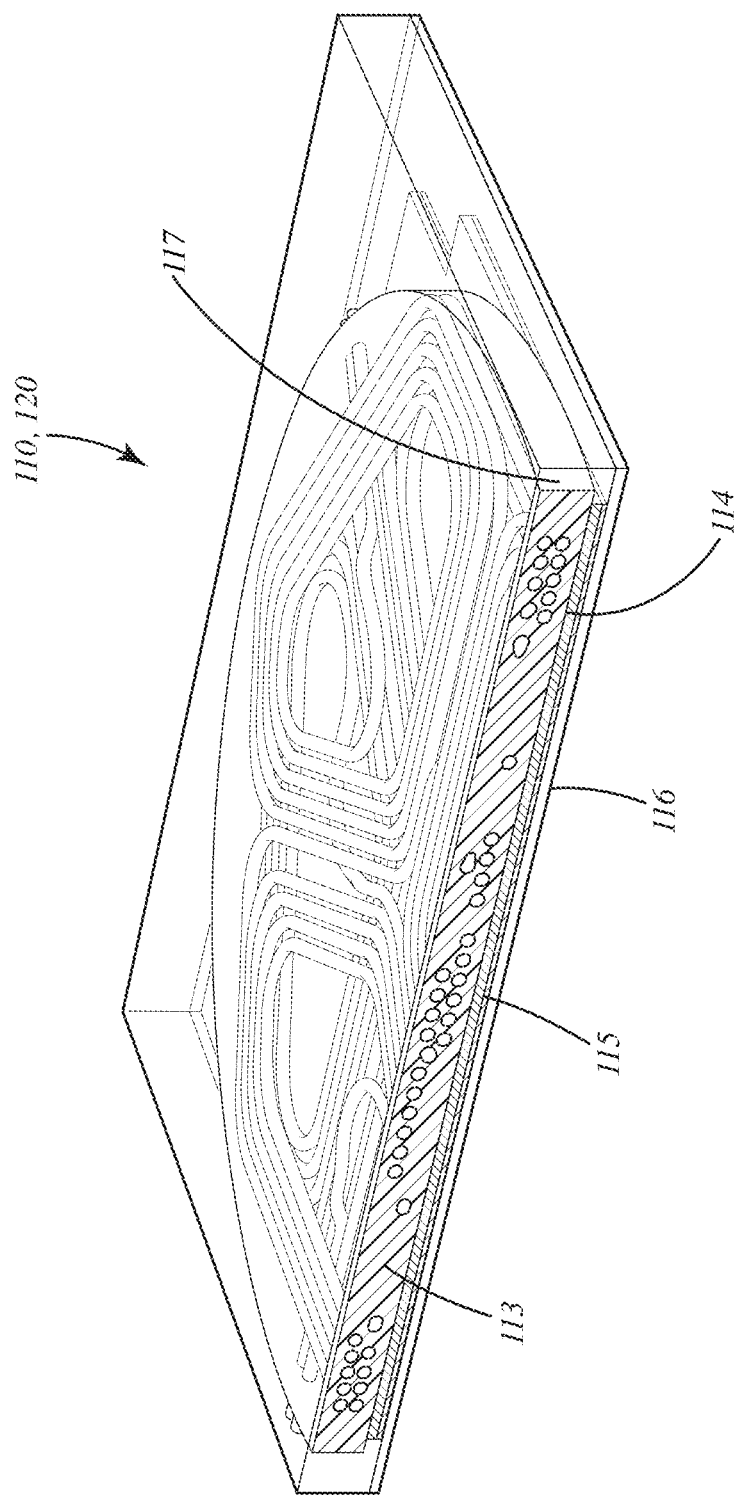
FIG. 7 shows a sectional view of the wireless power transmitter in FIG. 5.

Turning to FIG. 7, a sectional view of the wireless power transmitter 110 or wireless power receiver 120 in FIG. 5 is shown. The wireless power transmitter 110 includes the coil assembly 112, the core 114, and the backplate 116. Optionally, and thermally conducting layer 115 is provided between the core 114 and the backplate 116. The thermally conducting layer 115 may correspond to a thermally conducting film operable to thermally couple the core 114 to the backplate 116. The thermally conducting layer 115 may be either electrically conductive or electrically insulative.

In one embodiment, the thermally conducting layer 115 may include epoxy and/or thermal paste operable to facilitate heat transfer between the core 114 and the backplate 116. The thermally conducting layer 115 may couple the backplate 116 and the core 114 to provide a high thermal conductive path for the core 114 and to mitigate a thermal hot spot in the core due to a variety of reasons, including for instance high flux density and cracks in the core 114.

The coil assembly 112 in the illustrated embodiment may include a coil support 111 operable to support each of the phase coils A, B, C in place relative to each other. The coil support 111 may take a variety of different forms and constructions. In one embodiment, the coil support 111 may include epoxy and/or a rigid structure with one or more support channels for portions of the phase coils A, B, C. The coil support 111 in one embodiment may be configured to facilitate transfer of thermal energy to the core 114 and/or the backplate 116. The epoxy described in conjunction with the coil support 111 may be alternatively described as a thermal mitigation element 113 separate from the coil support 111 and operable to facilitate heat transfer from the coil assembly 112 to one or more other components, such as the core 114 and the backplate 116. Such a thermal mitigation element 113 (e.g., thermal epoxy) may or may not provide support for the phase coils of the coil assembly 112.

The wire of the phase coils A, B, C may be routed by a coil support 111 in the form of a thermal plastic or thermal epoxy-based wire guide with a low thermal resistance to provide a wire routing path. The coil support 111 may further be configured to reduce or minimize thermal resistance between phase coils A, B, C and the core 114.

The wire of the phase coils A, B, C, which may be Litz wire-based and/or copper file-based coils, can be filled with a coil support 111 in the form of a thermal mitigation element 113 (e.g., a thermal epoxy) to reduce or minimize thermal hotspots in the wire of the phase coils A, B, C and allow an increase in the current density of the wire to 10-15 A/mm$^2$ or more.

Figure 8A:
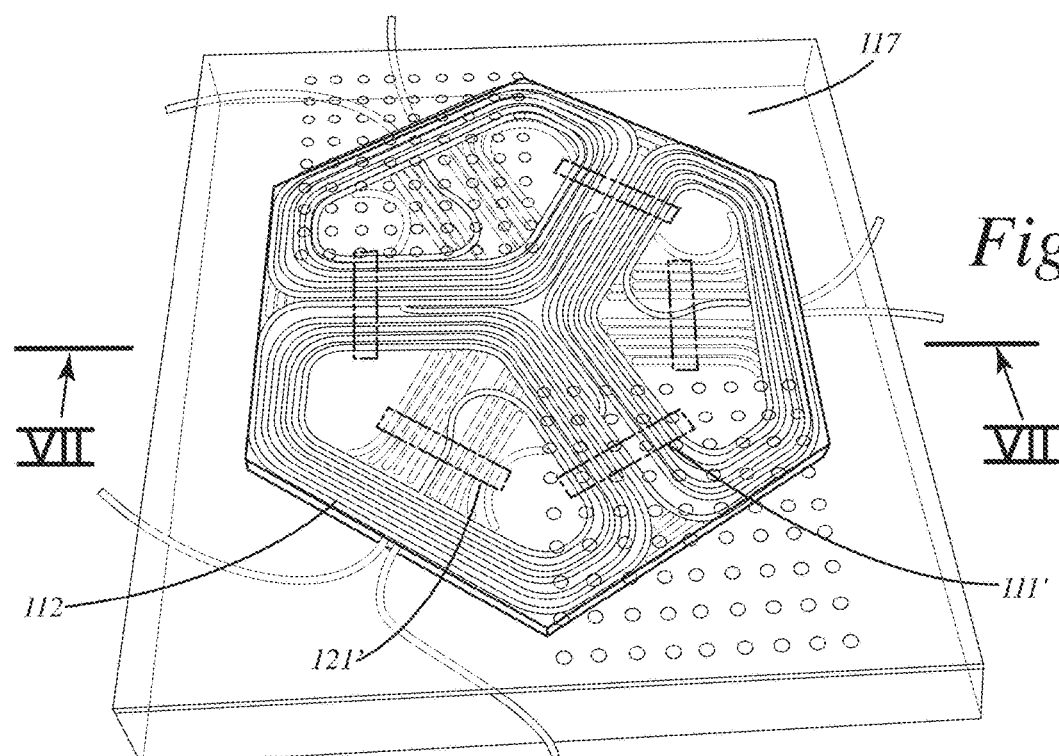
FIG. 8A shows a wireless power transmitter in accordance with one embodiment.
Figure 8B:
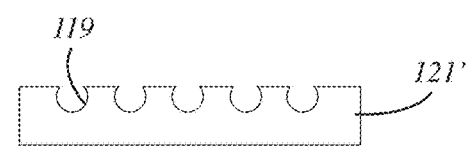
FIG. 8B shows a support holder for wires in accordance with one embodiment.

A coil support 111' with a rigid structure according to one embodiment is depicted in FIG. 8A. The coil support 111' in the illustrated embodiment is provided in the form of a plurality of rigid structures spaced about the central axis of the coil assembly 112, each of the rigid structures including channels operable to accept and maintain a position of a wire of a phase coil A, B, C, relative to the other wires of the phase coil A, B, C. The coil support 111' in the illustrated embodiment includes a holder (e.g., a plastic holder) with wire guides 121', and the phase coils A, B, C are disposed in the wire guides 121'. A sectional of the wire guides 121' are shown in further detail in FIG. 8B, including channels 119 adapted to receive and hold the wires of the phase coils A, B, C in the coil assembly 112.

Figure 9:
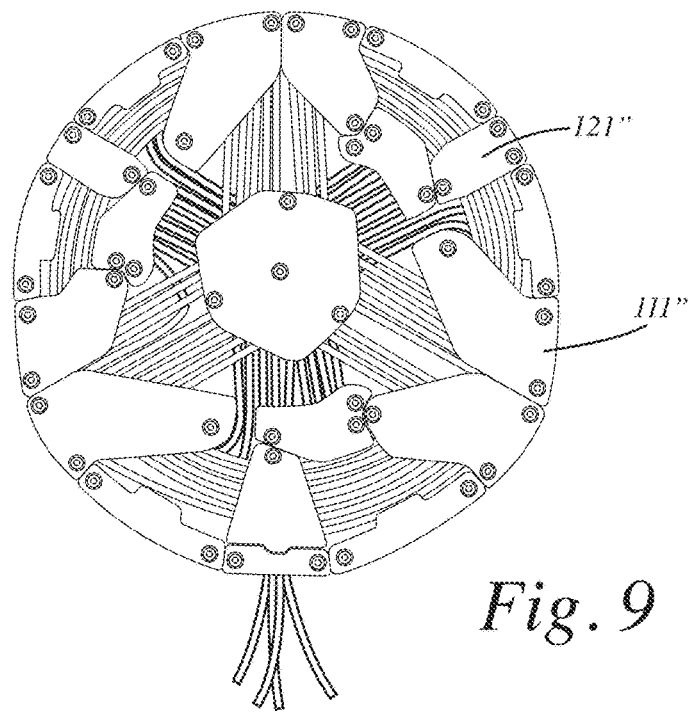
FIG. 9 shows a wireless power transmitter in accordance with one embodiment.

A coil support 111" with a rigid structure according to one embodiment is depicted in FIG. 9. The coil support 111" in the illustrated embodiment is provided in the form of a plurality of rigid structures operable to sandwich the phase coils A, B, C therebetween. Each of the rigid structures may optionally contain channels operable to accept and maintain a position of a wire of a phase coil A, B, C, relative to the other wires of the phase coil A, B, C. The coil support 111" in the illustrated embodiment includes a holder (e.g., a plastic holder) without wire guides but includes clamp-like structures 121" formed of thermally conducting plastic to support the phase coils A, B, C in position.

The coil supports 111', 111", in one embodiment, may be fully or partially removed after filling the transmitter and/or receiver with the thermal mitigation element 113 (e.g., filling with epoxy).

In one embodiment, as described herein, a plastic coil holder or coil support 111 in the form of a holder, and its related impact on the thermal performance, can be omitted. To do so, the phase coils A, B, C can be encapsulated in a thermal mitigation element 113, such as thermal epoxy, and any supporting plastic holder can be removed prior to assembling the encapsulated coil into a wireless power transmitter 110 and/or a wireless power receiver 120.

III. Loss Distribution

For purposes of discussion, the WPS 10 described in conjunction with FIGS. 1-4 operable for 50 kW and polyphase operation can be analyzed for loss distributions. It is to be understood that a WPS 10 configured in a different manner may be similarly analyzed for loss distributions. The specifications of the WPS 10 are provided below in Table I.

TABLE 1

System Parameters

| Parameter | Values |
| --- | --- |
| Power rating | 50 kW |
| Input DC voltage | 500 V |
| Output battery voltage | 500 V |
| Tx currents (A) | 66, 66∠120, 66∠240 |
| Rx currents (A) | 66∠90, 66∠210, 66∠330 |
| Airgap, d | 150 mm |
| Center operating frequency | 85 kHz, or in a range of 10-100 kHz |
| Room temperature | 20° C. |

The inductance matrix of the WPS 10 can be defined as follows:

$$L = \begin{bmatrix} L_a & L_{ba} & L_{ca} & L_{xa} & L_{ya} & L_{za} \\ L_{ab} & L_b & L_{cb} & L_{xb} & L_{yb} & L_{zb} \\ L_{ac} & L_{bc} & L_c & L_{xc} & L_{yc} & L_{zc} \\ L_{ax} & L_{bx} & L_{cx} & L_x & L_{yx} & L_{zx} \\ L_{ay} & L_{by} & L_{cy} & L_{xy} & L_y & L_{zy} \\ L_{az} & L_{bz} & L_{cz} & L_{xz} & L_{yz} & L_z \end{bmatrix} = \begin{bmatrix} 31.6 & -9.8 & -9.8 & -5.3 & 1.2 & 3.3 \\ -9.8 & 32.2 & -10.2 & 3.7 & -5.2 & 1.3 \\ -9.8 & -10.2 & 32.3 & 1.5 & 3.5 & -5.1 \\ -5.3 & 3.7 & 1.5 & 31.1 & -10.0 & -9.8 \\ 1.2 & -5.2 & 3.5 & -10.0 & 31.3 & -9.9 \\ 3.3 & 1.3 & -5.1 & -9.8 & -9.9 & 31.6 \end{bmatrix} \mu H$$

The wireless power transmitter 110 and/or the wireless power receiver 120, as described herein, may include the coil assembly 112 and a core 114. The coil assembly 112 may include a coil support 111, such as a coil holder formed of ABS plastic as well as a thermal mitigation element (e.g., thermal epoxy). The wireless power transmitter 110 and/or the wireless power receiver 120 may be provided in a housing, such as the housing 117 depicted in the illustrated embodiment of FIG. 8A. The housing 117 may be a Lexan housing—although it is to be understood that the housing may be configured differently depending on the application and may be absent in one or more embodiments.

Properties of the Litz wire of the coil assembly 112, plastic insulation of the housing 117, core 114 (e.g., a ferrite core), thermal mitigation element 113 (e.g., thermal epoxy), thermally conducting layer 115 (e.g., thermal paste), and backplate 116 are provided for one embodiment as follows:

TABLE II

MECHANICAL AND THERMAL PROPERTIES OF WCS COMPONENTS

| Component | Density (kg m$^{-1}$) | Thermal conductivity (W/m K) | Temperature limit (° C.) |
| --- | --- | --- | --- |
| Litz Wire | 4800 | ~5.0 | 155 |
| Ferrite Core | 4600 | 4.01 | 130 |
| Aluminum Backplate | 2700 | 238 | |
| ABS Plastic Housing | 1020 | 0.14 | 150 |
| Filling Epoxy SC-320 | — | 3.2 | |
| Thermal Paste TC-5622 | — | 4.3 | |

The phase coils A, B, C include Litz wire AWG38×1650, and the core 114 is made with 5 mm thick Ferroxcuble 3C95 ferrite tiles. Herein, alternative configurations may be utilized such that the present disclosure is not so limited. For instance, alternative configurations may also reduce or mitigate the temperature of the coil assembly 112 and the core 114, without increasing the size of the wireless power transmitter 110 and/or the wireless power receiver 120.

For purposes of discussion, the loss distribution in the coil assembly 112 may be assumed to be uniform across the coil length. Therefore, based on the topology and winding distribution of the coil assembly 112, the loss distribution in the wireless power transmitter 110 and/or the wireless power receiver 120 due to coil loss may be different. The coil loss in Litz wire may be determined as $P_{Litz}=I_{coil}^2 R_{ac}$, where $R_{ac}$ is a function of temperature. The Litz wire in one embodiment may have a low thermal conductivity and a thermal limit of 155° C. The core loss may be determined as $P_{core}(B)=C_m f^\alpha B^\beta (C_{r2}T^2 - C_{r1}T + C_{r0}) \times 10^{-3}$. This core loss calculation indicates a non-uniform distribution of B and loss, and a core with a thermal limit of 130° C. The shield loss (e.g., the back plate loss) is considered to be a low loss configuration with high thermal conductivity.

A unipolar coil assembly (not shown) may provide a higher copper loss distribution along the periphery of the assembly, while a bipolar coil assembly 112 may provide a higher loss distribution in the center of the coil assembly 112. Like a bipolar single-phase system, a bipolar polyphase system like the WPS 10 in the illustrated embodiments of FIGS. 1-4 may have a higher loss distribution in the center of the coil assembly 112. The pattern of the core loss distribution in a coil assembly 112 is like the coil loss distribution. However, unlike the coil loss, the core loss is highly non-uniform in a core 114. Therefore, at 85 kHz, the core 114 may be configured to operate near 150-200 mT, which is much below its saturation level of ~500 mT, to keep the peak core temperature below 130° ° C. By enhancing the thermal mitigation of the WPS 10 according to one embodiment, the core utilization may be increased to up to 350-400 mT under its thermal limit, making the core 114 much thinner for a high power WPS. In this system, the peak flux density in the core 114 is 350 mT at the center of the wireless power transmitter 110 and/or the wireless power receiver 120.

A thermal analysis of the coil assembly 112 and the core 114 for a ten-minute operation may indicate that thermal mitigation may facilitate wireless power transfer. The results shows that the coil temperature ranges up to 70° C. However, the peak receiver core temperature at the center of the core 114 increases to 122° C., which is near the optimal temperature limit of the ferrite of the core 114 and, at the steady state operation, the temperature may be much higher. However, the periphery of the core 114 shows a much lower temperature. The results indicate that thermal mitigation may facilitate balancing the heat distribution in the core 114 and to mitigate the hotspot in the core 114. In one embodiment, loss balancing may be provided by varying the thickness of the core 114, which may partly increase the core thickness. Additionally or alternatively, thermal mitigation configurations described herein may be adopted to balance the heat distribution, rather than loss distribution.

In one embodiment, as described herein, the coil assembly 112 and the core 114 may be the two main sources of loss. An additional source of loss may be the backplate 116, depending on the topology of the coil assembly 112. Increasing the power density may result in an increase in the losses in the coil assembly 112 and the core 114, which may be configured according to one embodiment for effective and faster heat distribution and dissipation to keep the temperature under a limit (optionally under an optimal limit). It is noted that a Litz wire-based coil assembly 112 and a core 114 formed of ferrite may have much lower thermal conductivity, which can lead to potential thermal hotspot and temperature unbalance in the wireless power transmitter 110 and/or the wireless power receiver 120. In one embodiment, a thermal mitigation element 113 may be provided for the phase coils A, B, C of the coil assembly 112 in the form thermal epoxy (e.g., thermal epoxy SC-320), which may have a much higher thermal conductivity than Litz wire, as identified in Table II.

By incorporating thermal mitigation element 113, such as thermal epoxy, into the coil assembly 112, a faster heat transfer path may be provided that significantly increases the thermal capacity of the wireless power transmitter 110 and/or the wireless power receiver 120, thereby effectively reducing or substantially avoiding a localized hotspot.

It is noted that ferrite and epoxy may have a similar thermal conductivity. In one embodiment, the thermally conducting layer 115 may include a thin layer of thermal epoxy or other thermal interface material between the ferrite of the core 114 and aluminum of the backplate 116, effectively thermally connecting the core 114 and the backplate 116. As a result, the thermal unbalance in the ferrite of the core 114 can be mitigated by the Al backplate 116, which has about 60 times higher thermal conductivity than the ferrite-based core 114.

Conventionally, a backplate may be used as a mechanical support of a wireless power transmitter and/or wireless power receiver, as well as a shield from magnetic fields. In one embodiment of the present disclosure, the backplate 116 (e.g., a shield, such an aluminum shield) may be utilized as a heat sink, which may facilitate balancing the temperature distribution inside the wireless power transmitter 110 and/or the wireless power receiver 120 and dissipate the heat outside. As Table II indicates, in a wireless power transmitter 110 and/or a wireless power receiver 120, aluminum has a high thermal conductivity compared to many other materials. A backplate 116 formed of aluminum may be considered as a short-circuit path in the thermal circuit. Once the wireless power transmitter 110 and/or the wireless power receiver 120 is filled with thermally conductive epoxy in the thermal mitigation element 113, the back plate 116 form double aluminum and may provide a highly conductive heat transport path and mitigates the thermal hotspot from the center of the wireless power transmitter 110 and/or the wireless power receiver 120.

Figure 10:
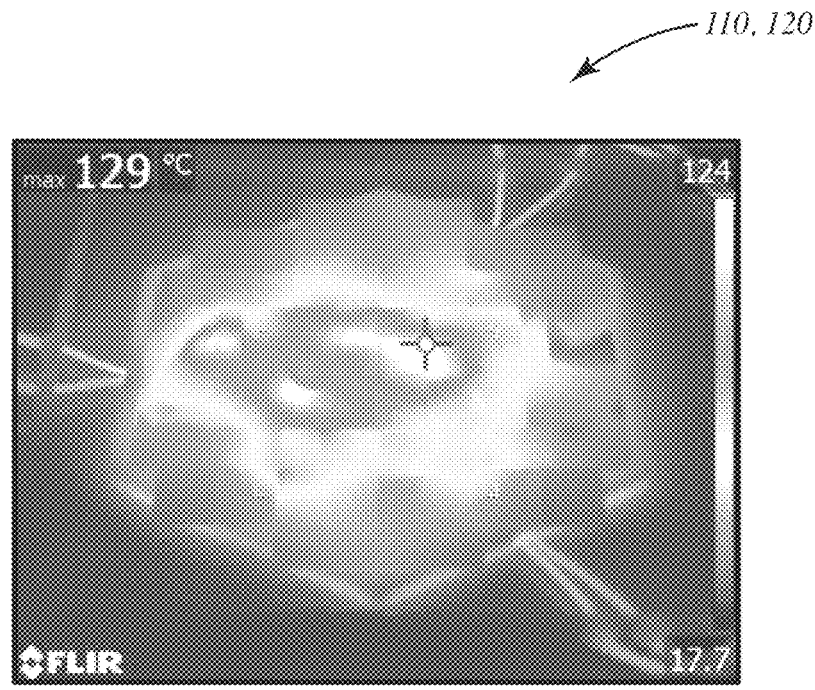
FIG. 10 shows a temperature distribution of a wireless power receiver.

Turning to the illustrated embodiments of FIG. 10, the temperature distribution is depicted for a wireless power receiver 120 without a backplate 116. The temperature distribution is shown after seven minutes of rated power operation.

FIG. 10 shows the peak temperature at the center of the wireless power receiver 120 increased to 129° C., while the periphery of the core 114 remained near room temperature. The test was suspended after seven minutes due to the significant temperature increase in the exposed core 114.

Figure 11:
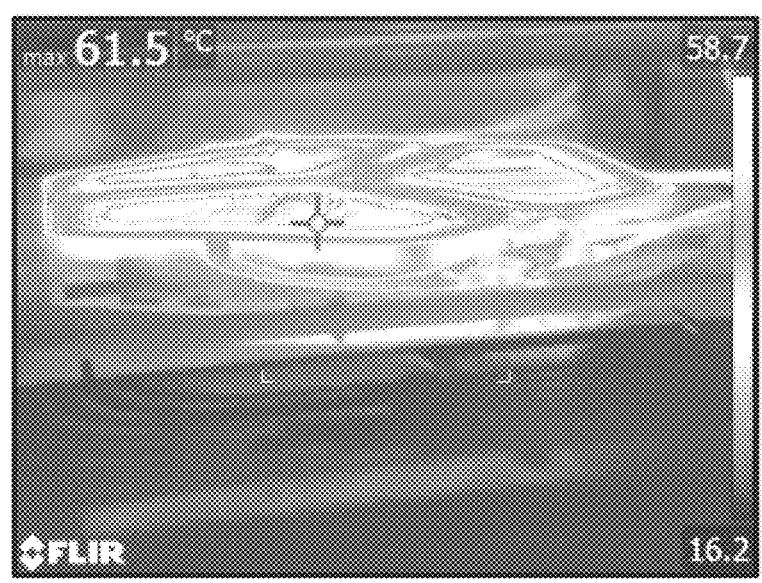
FIG. 11 shows a temperature distribution of a wireless power transmitter.

FIG. 11 shows the temperature distribution of a wireless power transmitter 110 without the thermal mitigation element 113. The results show that most of the loss is concentrated non-uniformly in the coil assembly 112. The inner turns of the coil assembly 112 showed comparatively higher loss than the outer turns. These results indicate that any assumptions of uniform loss distribution all through the coil length of the Litz wire are incorrect. The inner turns of the coil assembly 112 may not dissipate heat as much as the outer turns, and therefore the outer turns may block some of the heat generated by the inner turns.

In the illustrated embodiment of FIG. 7, a wireless power transmitter 110 and/or a wireless power receiver 120 is depicted in the coil assembly 112 including a thermal mitigation element 113 (e.g., the phase coils A, B, C, are filled with thermal epoxy) to reduce or minimize a localized hotspot near the coil area.

In the illustrated embodiment, optionally, the gap between the backplate 116 (e.g., an aluminum backplate) and the core 114 (e.g., ferrite core) may be provided with a thermally conducting layer 115, which may include thermal paste.

In some circumstances, a further gap may be present between thermal paste and the backplate 116 due to gravitational force and thermal deformation in the coil support 111 (e.g., a receiver coil holder). In an alternative embodiment, the core 114 (e.g., a core with ferrite) may be glued to the backplate 116 with an adhesive, such as thermal epoxy (e.g., thermal epoxy SC-320). The ferrite of the core 114 in a wireless power transmitter 110 may be configured such that the weight of the coil assembly 112 and the core 114 may maintain the backplate 116 thermally connected to the core 114.

Figure 12:
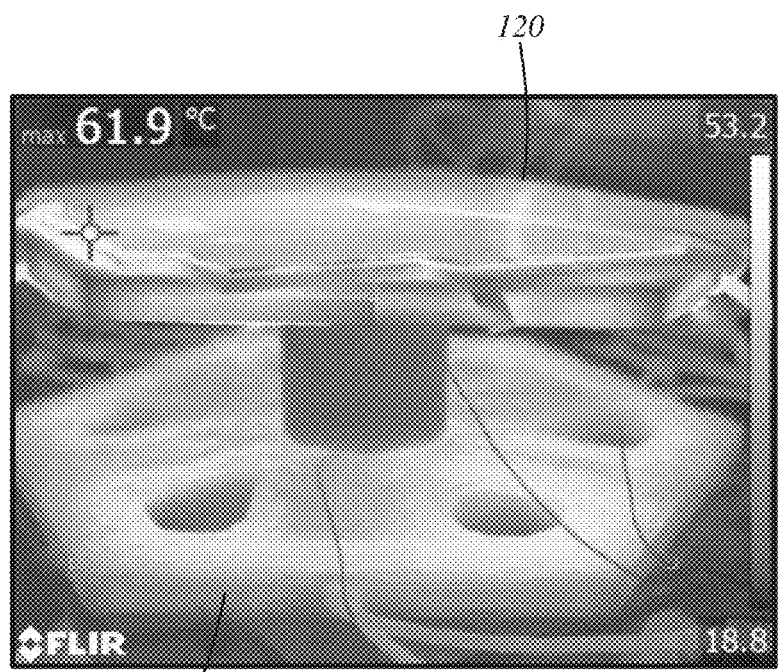
FIG. 12 shows a temperature distribution of a wireless power transmitter in accordance with one embodiment.

The temperature distribution for a wireless power transmitter 110 with a thermal mitigation element 113 (e.g., thermal epoxy) is shown in FIG. 12, which indicates that the temperature is more balanced compared to the wireless power transmitter 110 without the thermal mitigation element 113 depicted and described in conjunction with FIG. 11. A significant portion of the wireless power transmitter 110 includes a support holder 111 that is thermally resistive (e.g., a thermally resistive coil holder), which, may block or impede the heat transfer among the coil coils A, B, C and the core 114 and backplate 116. To reduce or minimize the temperature of the coil assembly 112, the area of the support holder 111 may be reduced or minimized such that it provides a highly thermally conductive path between the coil assembly 112 and the core 114 through the thermal mitigation element 113.

Figure 13:
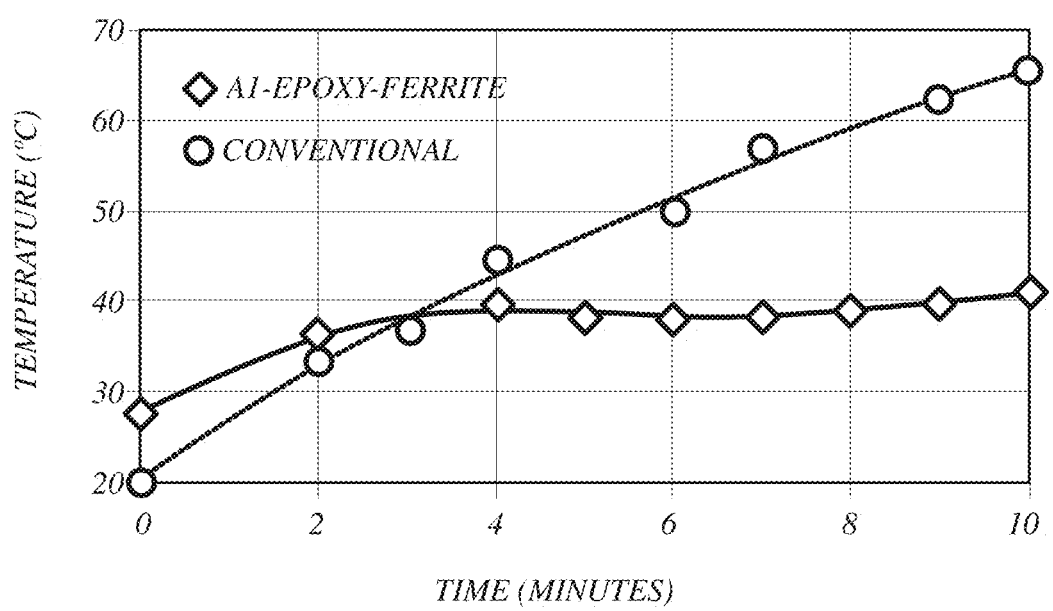
FIG. 13 shows a plot of temperature over time for a conventional system and a wireless power of the system in accordance with one embodiment.

A wireless power transmitter 110 according to one embodiment described herein includes a thermally conducting layer 115 (e.g., a thermal adhesive in the form of thermal epoxy) between the core 114 and the backplate 116. FIG. 13 shows the temperature variation of the center of the core 114 of such a wireless power transmitter 110 with a core 114, thermally conducting layer 115, back plate 116 configuration (e.g., ferrite-epoxy-aluminum), and contrasts this temperature variation with the center of a core 114 of a conventional configuration with ferrite-plastic-aluminum. The comparison indicates that the backplate 116 (e.g., an aluminum back plate) can significantly mitigate a thermal hotspot and balance the heat distribution in the wireless power transmitter 110 and/or a wireless power receiver 120 in conjunction with the thermally conducting layer 115.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A three-phase wireless power transfer (3φ-WPT) system for wirelessly providing high-frequency AC power to an electric vehicle or a plug-in electric vehicle, the system comprising:
an off-board transmitter comprising a transmitter pad configured to wirelessly transmit the high-frequency AC power; and
an on-board receiver comprising a receiver pad configured to receive the high-frequency AC power when the transmitter pad and the receiver pad are disposed adjacent to each other and spaced apart through a gap,
wherein the transmitter pad and the receiver pad each includes:
three bipolar coils,
an Al backplate,
ferrite core sandwiched between the three bipolar coils and the Al backplate, and
a thermally conducting film arranged and configured to thermally couple the ferrite core and the Al backplate,
wherein the transmitter pad and the receiver pad are arranged to face each other's three bipolar coils across the gap.

2. The system of claim 1, wherein the thermally conducting film of each of the transmitter pad and the receiver pad includes epoxy.

3. The system of claim 1 wherein
the thermally conducting film of the transmitter pad includes thermal paste, and
the thermally conducting film of the receiver pad comprises epoxy.

4. The system of claim 1 wherein either the transmitter pad or the receiver pad or both includes:
a thermally conducting and electrically insulating plastic support having channels, the corresponding three bipolar coils being disposed inside the support's channels.

5. The system of claim 1 wherein
the transmitter pad and the receiver pad each comprises an electrically insulating plastic support having channels, the transmitter pad's three bipolar coils and the receiver pad's three bipolar coils being disposed inside the corresponding support's channels, and
either the transmitter pad or the receiver pad or both comprises thermally conducting and electrically insulating epoxy filling the corresponding support's channels such that the three bipolar coils disposed therein are immersed in the epoxy.

6. The system of claim 1 wherein either the transmitter pad or the receiver pad or both includes:
thermally conducting and electrically insulating epoxy encapsulating the corresponding three bipolar coils.

7. The system of claim 1 wherein the Al backplate of either the transmitter pad or the receiver pad or both is configured for liquid cooling.

8. The system of claim 1 wherein the high-frequency AC power is in a range of 50-250 kW.

9. The system of claim 8 wherein the high-frequency AC power is about 150 kW.

10. The system of claim 1 wherein a fundamental frequency of the high-frequency AC power is in a range of 10-100 kHz.

11. The system of claim 10 wherein the fundamental frequency is about 85 kHz.

12. A wireless power transmitter comprising:
a transmitter configured to wirelessly transmit power, said transmitter including three bipolar coils operable to transmit power wirelessly to a wireless receiver separate from the wireless power transmitter;
an aluminum backplate;
a ferrite core disposed between the three bipolar coils and the aluminum backplate; and
a thermally conducting film arranged to thermally couple the ferrite core to the aluminum backplate.

13. The wireless power transmitter of claim 12 wherein the transmitter is configured to transmit three-phase power.

14. The wireless power transmitter of claim 12 wherein the thermally conducting film includes epoxy.

15. The wireless power transmitter of claim 12 wherein the thermally conducting film includes thermal paste.

16. The wireless power transmitter of claim 12 comprising a thermally conducting and electrically insulating plastic support that includes channels, wherein the three bipolar coils are disposed respectively within the channels of the thermally conducting and electrically insulating plastic support.

17. A wireless power receiver comprising:
a receiver configured to wirelessly receive power, the receiver including three bipolar coils operable to receive power wirelessly from a wireless transmitter separate from the wireless power receiver;
an aluminum backplate;
a ferrite core disposed between the three bipolar coils and the aluminum backplate; and a thermally conducting film arranged to thermally couple the ferrite core to the aluminum backplate.

18. The wireless power receiver of claim 17 wherein the receiver is configured to receive three-phase power.

19. The wireless power receiver of claim 17 wherein the thermally conducting film includes epoxy.

20. The wireless power receiver of claim 17 comprising thermally conducting and electrically insulating epoxy that encapsulates the three bipolar coils.

* * * * *